US012737165B2

(12) United States Patent
Shen

(10) Patent No.: US 12,737,165 B2
(45) Date of Patent: Sep. 15, 2026

(54) SERVICE CODE INTERPRETATION WEAVING METHOD, SERVICE SYSTEM AND STORAGE MEDIUM

(71) Applicants: Chongqing BOE Intelligent Technology Co., Ltd., Chongqing (CN); BOE TECHNOLOGY GROUP CO., LTD., Beijing (CN)

(72) Inventor: Xiaping Shen, Beijing (CN)

(73) Assignees: Chongqing BOE Intelligent Technology Co., Ltd., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 574 days.

(21) Appl. No.: 18/268,380

(22) PCT Filed: Apr. 6, 2022

(86) PCT No.: PCT/CN2022/085291
§ 371 (c)(1),
(2) Date: Jun. 20, 2023

(87) PCT Pub. No.: WO2023/193135
PCT Pub. Date: Oct. 12, 2023

(65) Prior Publication Data
US 2024/0385820 A1 Nov. 21, 2024

(51) Int. Cl.
*G06F 8/41* (2018.01)

(52) U.S. Cl.
CPC .................................... *G06F 8/451* (2013.01)

(58) Field of Classification Search
CPC ... G06F 8/40; G06F 8/451; G06F 8/73; G06F 9/44
See application file for complete search history.

(56) References Cited

U.S. PATENT DOCUMENTS 8,024,425 B2 * 9/2011 Stoyanova .......... H04L 63/0853 709/224
10,657,064 B1 * 5/2020 Khan ...................... G06F 16/00
(Continued)

FOREIGN PATENT DOCUMENTS

CN 104516919 A 4/2015
CN 107741847 A 2/2018
(Continued)

OTHER PUBLICATIONS

Anzhiruosu, "Use of the jsonserialize annotation," Source code, <https://blog.csdn.net/qq_30434271/article/details/121029399>, Anzhiruosu blog, Oct. 29, 2021.
(Continued)

*Primary Examiner* — Marina Lee
(74) *Attorney, Agent, or Firm* — HOUTTEMAN LAW LLC

(57) ABSTRACT

The present disclosure provides a service code interpretation weaving method, including: acquiring an entity class object generated by a background service module; and calling a customized serializer to perform an interpretation mapping on a code field value of a preset service code field in the entity class object, to obtain a code interpretation value corresponding to the code field value, and adding the code interpretation value to the entity class object. The present disclosure further provides a service system and a computer-readable storage medium.

13 Claims, 10 Drawing Sheets

(56) References Cited

U.S. PATENT DOCUMENTS

| | | | | |
|---|---|---|---|---|
| 2004/0230556 | A1* | 11/2004 | Mueller | G06F 9/4493 |
| 2005/0108627 | A1 | 5/2005 | Mireku | |
| 2009/0150367 | A1 | 6/2009 | Melnik et al. | |
| 2014/0181783 | A1* | 6/2014 | Rueger | G06F 8/35<br>717/104 |
| 2014/0289717 | A1* | 9/2014 | Chan | G06F 16/116<br>717/147 |
| 2016/0350089 | A1* | 12/2016 | Guo | H04L 67/568 |

FOREIGN PATENT DOCUMENTS

| | | | |
|---|---|---|---|
| CN | 107977446 | A | 5/2018 |
| CN | 108595680 | A | 9/2018 |
| CN | 110069252 | A | 7/2019 |
| CN | 110716715 | A | 1/2020 |
| CN | 111427841 | A | 7/2020 |
| CN | 111708749 | A | 9/2020 |
| CN | 112346721 | A | 2/2021 |
| CN | 112817592 | A | 5/2021 |
| CN | 112988225 | A | 6/2021 |
| CN | 113918158 | A | 1/2022 |
| EP | 3657354 | A1 | 5/2020 |

OTHER PUBLICATIONS

State Intellectual Property Office of People's Republic of China, First Office Action, Apr. 13, 2026, for corresponding CN application No. 202280000697.5.

* cited by examiner

Maintenance module
13
Modification unit
132
131
Data synchronization unit
Main processing unit
1311
Acquisition sub-unit
13111
Generation sub-unit
13112
Allocation sub-unit
13113
Summarizing sub-unit
13114
Slave processing unit
1312
Slave processing unit
1312

SERVICE CODE INTERPRETATION WEAVING METHOD, SERVICE SYSTEM AND STORAGE MEDIUM

TECHNICAL FIELD

The present disclosure relates to the field of display, in particular to a service code interpretation weaving method, a service system, and a computer-readable storage medium.

BACKGROUND

A common module is generally provided in a service system to maintain a set of service codes, each of which has a respective code interpretation. The common module belongs to a common resource and is often quoted by a service module. When the service module quotes the service code, not only a code field value but also a code interpretation value corresponding to the code field value are needed.

In practical applications, with development of the service and deep understanding of an administrator on the meaning represented by the code field value, the code interpretation value corresponding to a part of the code field value is modified in the common module, which results in that the service module quoting the code needs to synchronously modify the code interpretation value of the corresponding code field value, and thus, the coupling degree and maintenance cost for the modules are increased. In addition, with the increase of the number of the service modules, the workload of the maintenance for the code interpretation is increased correspondingly.

SUMMARY

In a first aspect, an embodiment of the present disclosure provides a service code interpretation weaving method, including:

- acquiring an entity class object generated by a background service module; and
- calling a customized serializer to perform an interpretation mapping on a code field value of a preset service code field in the entity class object, to obtain a code interpretation value corresponding to the code field value, and adding the code interpretation value to the entity class object.

In some embodiments, the performing the interpretation mapping on the code field value of the preset service code field includes:

acquiring the code interpretation value corresponding to the code field value according to pre-stored mapping data, where the mapping data include different code field values and code interpretation values corresponding to the code field values.

In some embodiments, before the performing the interpretation mapping on the code field value of the preset service code field, the method further includes:

acquiring the mapping data from a storage server, and storing the mapping data in a cache.

In some embodiments, the acquiring the code interpretation value corresponding to the code field value according to the pre-stored mapping data includes:

acquiring the code interpretation value corresponding to the code field value according to the mapping data stored in the cache.

In some embodiments, the method further includes:

synchronously modifying the mapping data in the cache and the storage server in response to a mapping modification request.

In some embodiments, the acquiring the mapping data from the storage server includes:

- acquiring a total number of pieces of correspondence data included in the mapping data stored in the storage server, where one piece of correspondence data includes one code field value and a code interpretation value corresponding to the code field value;
- generating a plurality of data acquisition tasks according to the total number of pieces of the correspondence data;
- allocating the plurality of data acquisition tasks to a plurality of slave processing units, respectively, so that each slave processing unit acquires correspondence data corresponding to a received data acquisition task from the storage server according to the received data acquisition task; and
- receiving the correspondence data returned by each slave processing unit, and summarizing the correspondence data to obtain the mapping data.

In some embodiments, the generating the plurality of data acquisition tasks according to the total number of pieces of the correspondence data includes:

- calculating the number n of data acquisition tasks to be generated according to the total number q of pieces of the correspondence data and the number p of pieces of correspondence data corresponding to a preset single data acquisition task; where $$n = \left\lceil \frac{q}{p} \right\rceil, \text{ and } \left\lceil \frac{q}{p} \right\rceil$$

and indicates an upward-rounded value of a quotient of q divided by p; and
- determining the correspondence data corresponding to each data acquisition task in the mapping data, and generating each data acquisition task, where the correspondence data corresponding to different data acquisition tasks are different.

In some embodiments, the allocating the plurality of data acquisition tasks to the plurality of slave processing units, respectively includes:

- determining the number of usable slave processing units and a node address of each slave processing unit;
- determining an allocation number corresponding to each data acquisition task, where the allocation number corresponding to the $i^{th}$ data acquisition task is S_i=Hash(M_i) % j, M_i represents a task number corresponding to the $i^{th}$ data acquisition task, j represents the number of usable slave processing units, Hash (M_i) represents the Hash operation on the task number M_i corresponding to the $i^{th}$ data acquisition task, and % represents a remainder operation;
- determining the node address corresponding to each data acquisition task according to number-address correspondence data acquired in advance, where the number-address correspondence data include different allocation numbers and node addresses corresponding to the different allocation numbers; and
- sending each data acquisition task to the corresponding slave processing unit according to the node address corresponding to each data acquisition task.

In some embodiments, after adding the code interpretation value to the entity class object, the method further includes:

performing a serialization processing on the entity class object including the code interpretation value, to obtain serialized data; and feeding back the serialized data to the service request end.

In some embodiments, the preset service code field included in the entity class object is configured with a customized serialization annotation specifying the customized serializer;

the customized serialization annotation is @JsonSerialize annotation; and the customized serializer is a customized jackson serializer.

In a second aspect, an embodiment of the present disclosure further provides a computer-readable storage medium, in which a computer executable instruction is stored, and when a processor executes the computer executable instruction, the method provided in the first aspect is implemented.

In a third aspect, an embodiment of the present disclosure further provides a service system, including: a background service module and a serialization module, where the background service module is configured with a service data acquisition interface, and the serialization module includes an interception calling unit and a customized serializer;

the service data acquisition interface is configured to generate a corresponding entity class object in response to a service data calling request; the preset service code field included in the entity class object is configured with a customized serialization annotation specifying the customized serializer;

the interception calling unit is configured to acquire the entity class object generated by the background service module; and the customized serializer is configured to perform an interpretation mapping on a code field value of a preset service code field in the entity class object, to obtain a code interpretation value corresponding to the code field value, and add the code interpretation value to the entity class object.

In some embodiments, the customized serializer includes:

an acquisition unit configured to acquire the code field value of the preset service code field;

a mapping unit configured to perform the interpretation mapping on the code field value to obtain the code interpretation value corresponding to the code field value; and an adding unit configured to add the code interpretation value to the entity class object.

In some embodiments, the mapping unit is configured to acquire the code interpretation value corresponding to the code field value according to pre-stored mapping data, where the mapping data include different code field values and code interpretation values corresponding to the code field values.

In some embodiments, the service system further includes: a maintenance module, where the maintenance module includes: a data synchronization unit; and the data synchronization unit is configured to acquire the mapping data from a storage server and store the mapping data in the cache.

In some embodiments, the mapping unit is configured to acquire the code interpretation value corresponding to the code field value according to the mapping data stored in the cache.

In some embodiments, the maintenance module further includes: a modification unit; and the modification unit is configured to synchronously modify the mapping data in the cache and the storage server in response to a mapping modification request.

In some embodiments, the data synchronization unit includes: a main processing unit and a plurality of slave processing units;

the main processing unit includes:

an acquisition sub-unit configured to acquire a total number of pieces of correspondence data included in the mapping data stored in the storage server, where one piece of correspondence data includes one code field value and a code interpretation value corresponding to the code field value;

a generation sub-unit configured to generate a plurality of data acquisition tasks according to the total number of pieces of the correspondence data;

an allocation sub-unit configured to allocate the plurality of data acquisition tasks to the plurality of slave processing units, respectively; and a summarizing sub-unit configured to receive the correspondence data returned by each slave processing unit, and summarize the correspondence data to obtain the mapping data; and each slave processing unit is configured to acquire the correspondence data corresponding to a received data acquisition task from the storage server according to the received data acquisition task, and feed back the acquired correspondence data to the main processing unit.

In some embodiments, the generation sub-unit is configured to: calculate the number n of data acquisition tasks to be generated according to the total number q of pieces of the correspondence data and the number p of pieces of correspondence data corresponding to a preset single data acquisition task, where $$n = \left\lceil \frac{q}{p} \right\rceil, \text{ and } \left\lceil \frac{q}{p} \right\rceil$$

indicates an upward-rounded value of a quotient of q divided by p; determine the correspondence data corresponding to each data acquisition task in the mapping data, and generate each data acquisition task, where the correspondence data corresponding to different data acquisition tasks are different.

In some embodiments, the allocation sub-unit is configured to:

determine the number of usable slave processing units and a node address of each slave processing unit;

determine an allocation number corresponding to each data acquisition task, where the allocation number corresponding to the $i^{th}$ data acquisition task is S_i=Hash(M_i) % j, M_i represents a task number corresponding to the $i^{th}$ data acquisition task, j represents the number of usable slave processing units, Hash (M_i) represents the Hash operation on the task number M_i corresponding to the $i^{th}$ data acquisition task, and % represents a remainder operation;

determine the node address corresponding to each data acquisition task according to number-address correspondence data acquired in advance, where the number-address correspondence data include different allocation numbers and node addresses corresponding to the different allocation numbers; and send each data acquisition task to the corresponding slave processing unit according to the node address corresponding to each data acquisition task.

In some embodiments, the customized serializer further includes:

a serialization unit configured to perform a serialization processing on the entity class object including the code interpretation value to obtain serialized data; and a transmission unit configured to feed back the serialized data to the service request end.

In some embodiments, the preset service code field included in the entity class object is configured with a customized serialization annotation specifying the customized serializer;

the customized serialization annotation is @JsonSerialize annotation; and the customized serializer is a customized jackson serializer.

In some embodiments, the background service module is further configured with a service data adding interface; the service data adding interface is configured to add service data included in a service data adding request to the service database in response to the service data adding request.

DETAIL DESCRIPTION OF EMBODIMENTS

Figure 1:
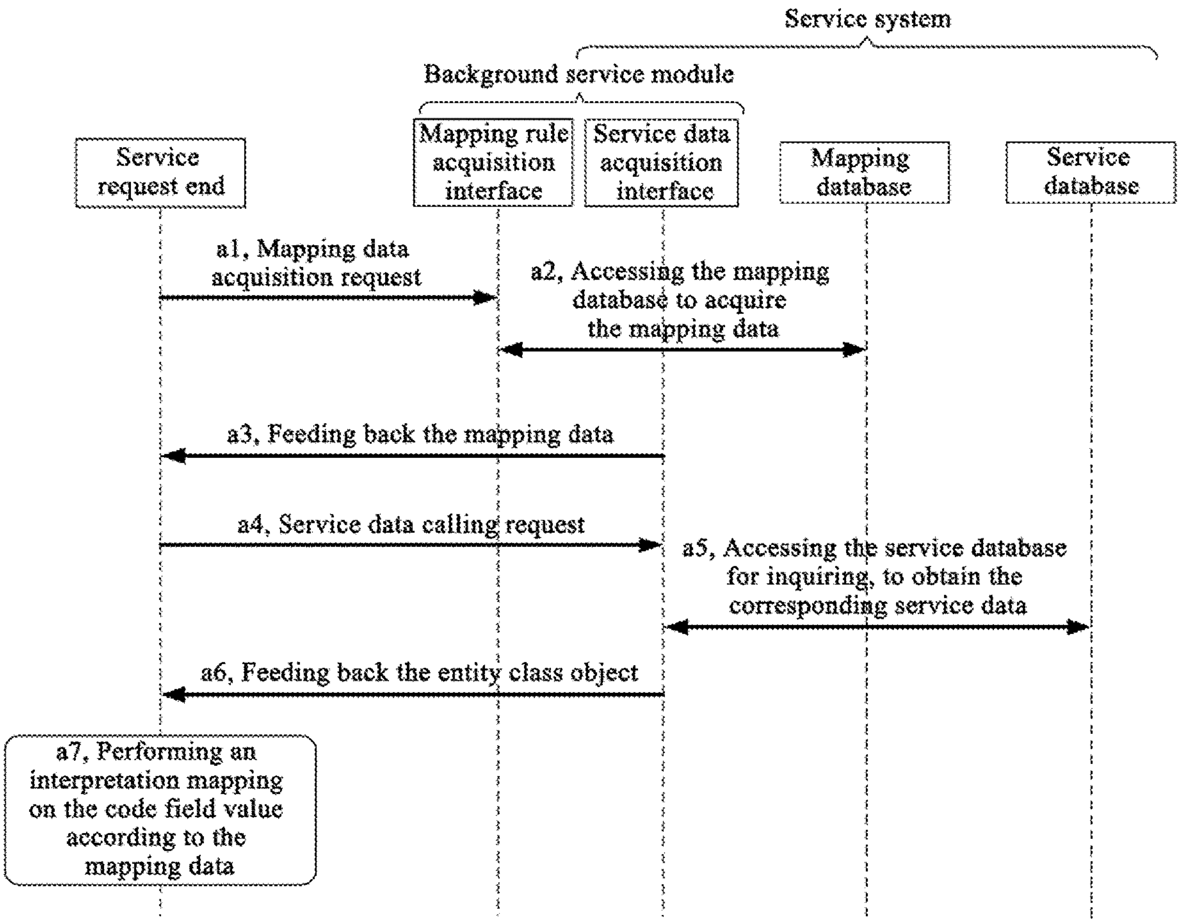
FIG. 1 is a schematic flowchart of a service processing method in the related art.

In order to enable one of ordinary skill in the art to better understand the technical solutions of the present disclosure, a service code interpretation weaving method, a service system, and a computer-readable storage medium according to the present disclosure will be described in further detail with reference to the accompanying drawings.

The drawings in the following description are only examples or embodiments of the present application, and it is obvious to one of ordinary skill in the art that the present application can be applied to other similar situations based on these drawings without inventive efforts. Moreover, it should be appreciated that such an effort in the development process might be complex and tedious. However, for one of ordinary skill in the art related to the content of the present disclosure, a change, such as a design, a fabrication, or a manufacture, performed for the content of the present disclosure is only the common general knowledge, which is not understood that the content of the present disclosure is insufficient.

Reference in the specification to "an embodiment" means that a particular feature, structure, or characteristic described in connection with the embodiment can be included in at least one embodiment of the specification. The appearances of the phrase in the specification do not necessarily all refer to the same embodiment, nor are separate or alternative embodiments mutually exclusive of other embodiments. It is to be expressly and implicitly understood by one of ordinary skill in the art that the embodiments described herein may be combined with other embodiments without conflict.

Unless defined otherwise, technical or scientific terms used herein shall have the ordinary meaning as understood by one of ordinary skill in the art to which the present disclosure belongs. The terms "a", "an" and "the" and the like used in the present disclosure do not denote a limitation of quantity, but may denote the singular or the plural. The use of the terms "including," "comprising," "having," and any variations thereof herein, means to cover a non-exclusive inclusion; for example, a process, method, system, product, or apparatus that includes a list of steps or modules (elements) is not limited to only those steps or elements, but may include other steps or elements not expressly listed or inherent to such process, method, product or apparatus. Reference to "connected," "coupled," and the like in this application is not intended to be limited to physical or mechanical connections, but rather can include electrical connections, whether direct or indirect connections. The term "plurality" as used herein means two or more. The term "and/or" describes the association relationship for the associated objects, indicating that there may be three relationships. For example, "A and/or B" may indicate following three cases: A exists alone, A and B exist simultaneously, and B exists alone. The character "/" generally indicates that the associated objects before "/" and after "/" are in an "or" relationship therebetween.

FIG. 1 is a schematic flowchart of a service processing method in the related art. As shown in FIG. 1, the service processing method relates to a service request end and a service system, where the service system includes a background service module, a service database, and a mapping database; the background service module is configured with a mapping rule acquisition interface and a service data acquisition interface; service data is stored in the service database; mapping data is stored in the mapping database; the service data includes rows of service records, which include at least service code fields, and the mapping data include different code field values and code interpretation values corresponding to the code field values.

Referring to steps a1 to a7 in FIG. 1, the specific process of the service request end acquiring the service data through the service system is as follows: firstly, the service request end acquires the mapping data through the mapping rule acquisition interface; then, the service request end sends a service data calling request to the service data acquisition interface, the background service module inquires corresponding service data from the service database according to the service data calling request, packages the inquired service data into an entity class object according to a predefined interface return format, and feeds back the entity class object data to the service request end, where the entity class object includes the code field value of the service code field, but does not include the code interpretation value of the code field value; and then, the service request end performs an interpretation mapping on the code field value of the service code field in the acquired entity class object according to the acquired mapping data, to obtain the code interpretation value corresponding to the code field value.

In order to simplify the processing flow, after the service request end acquires the mapping data, the mapping data is locally stored, and then the step of acquiring the mapping data is not needed when requesting the service data. Specifically, after receiving the entity class object data fed back by the background service module, the service request end performs the interpretation mapping on the code field value of the service code field in the entity class object fed back by the background service module based on the locally stored mapping data.

As the system is used, the mapping data in the background service module needs to be modified for some reason. In order to ensure the consistency of the data read by the service request end, the mapping data stored in the service request end and the mapping data stored in the service system should be consistent with each other, and when the mapping data in the background service module is modified, the mapping data locally stored in the service request end needs to be updated synchronously.

In practical applications, it has been found that the technical solution of the related art shown in FIG. 1 has the following problems: 1) the dependence of the service request end on the service system is increased, the coupling degree between the service request end and the service system is increased, and the maintenance difficulty for the service request end and the service system is increased; 2) when the mapping data in a certain service request end is not updated in time, the interpretation mapping of the service request end to the service code field is easily incorrect, namely the data consistency of the system is poor; 3) with the increase of the service time of the system, the number of the service request ends is increased, the workload of the synchronous updating of the mapping data is increased, and the maintenance cost is increased.

Figure 2:
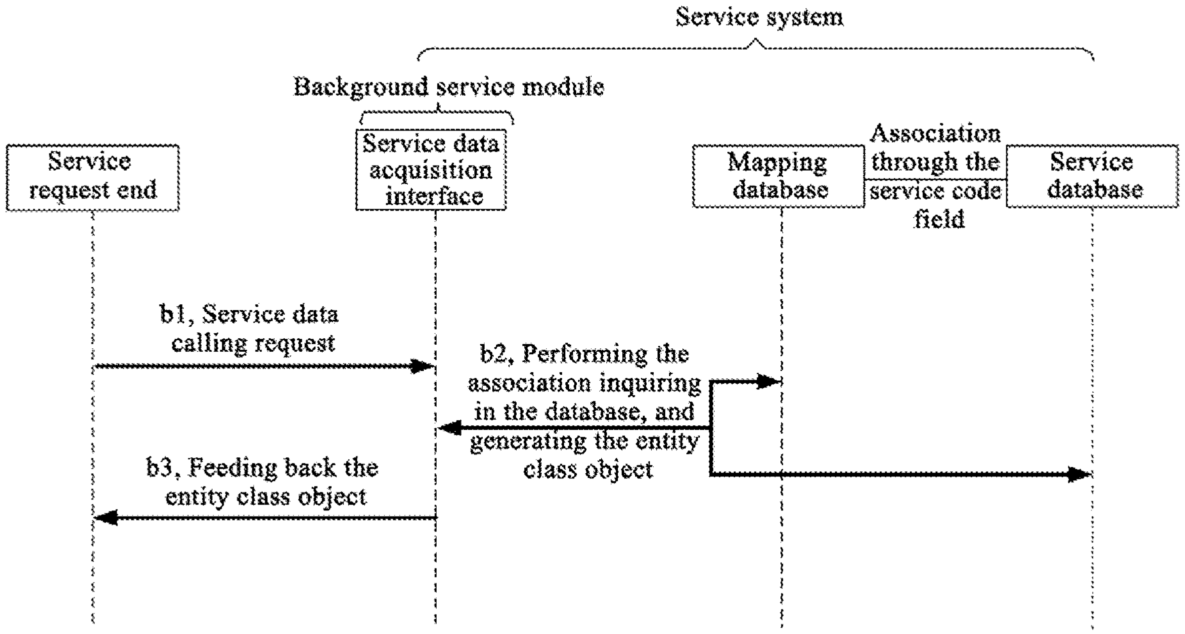
FIG. 2 is a schematic flowchart of another service processing method in the related art.

FIG. 2 is a schematic flowchart of another service processing method in the related art. As shown in FIG. 2, unlike the technical solution shown in FIG. 1 in which the interpretation mapping is performed by the service request end, in the technical solution shown in FIG. 2, the interpretation mapping is performed by the service system and the code interpretation value is determined based on a database association inquiring technology.

Referring to steps b1 to b3 in FIG. 2, specifically, the service data in the service database and the mapping data in the mapping database are associated with each other through the service code field in advance; after the service request end sends the service data calling request to the service data acquisition interface, the background service module firstly inquires the service data corresponding to the service data calling request from the service database, where the inquired service data includes the code field value of the service code field, but does not include the code interpretation value of the code field value; then inquires the code interpretation corresponding to the code field value of the service code field from the mapping database, by triggering through the service code, adds the code interpretation to the inquired service data, and then sends the service data including the code interpretation value to the service request end.

Although the technical solution of the related art shown in FIG. 2 can effectively solve the above problems of the technical solution shown in FIG. 1 in which the coupling degree between the service request end and the service system is high; the data consistency of the system is poor; the workload of the synchronous updating of the mapping data is large, the technical solution shown in FIG. 2 still has the following problems: 1) the service data in the service database and the mapping data in the mapping database are associated with each other through the service code field, so that the coupling degree between the service database the mapping database is increased, and the maintenance difficulty for the service database the mapping database is increased; 2) the operation process of performing the association inquiring based on the database association inquiring technology is slow, which results in low overall performance of the system.

To effectively improve at least one of technical problems existing in the related art, the present disclosure provides a service code interpretation weaving method.

Figure 3:
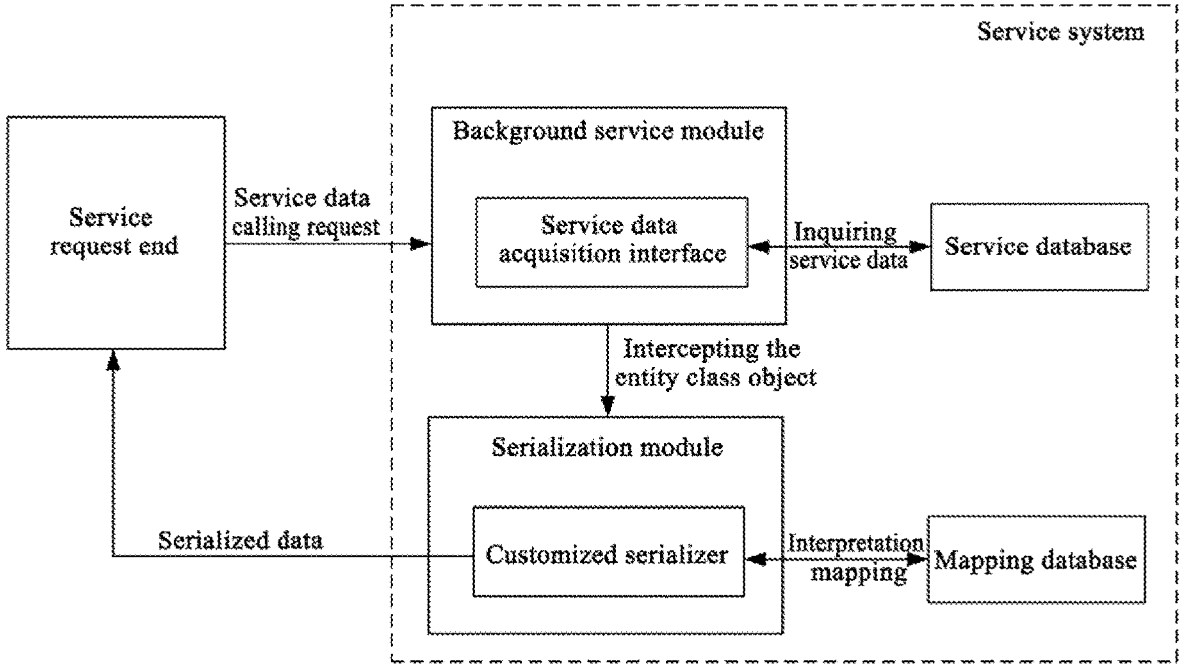
FIG. 3 is a schematic diagram of an application environment according to a technical solution of the present disclosure.

FIG. 3 is a schematic diagram of an application environment according to a technical solution of the present disclosure. As shown in FIG. 3, the application environment includes a service request end and a service system, the service request end may be used as a service module, and the service system may be used as a common module. The service system includes a background service module and a serialization module, and a customized serializer is registered in the serialization module.

The service request end may send a corresponding request to the service system, to perform operations such as adding, modifying, inquiring or the like on the service data in the service system. The service request end may be specifically a web page end (also referred to as a web end) or an application end (also referred to as an APP end). The service system includes the background service module, the service database and the serialization module (also called a serialization framework), where the background service module is provided with functional interfaces (also called a software interface and an API interface) with different functions, and the service request end may manage and access the service data in the service database through the functional interfaces provided by the background service module, such as performing operations such as adding, modifying, inquiring or the like on the service data. The service database stores the service data therein, and the service data includes at least the service code field. Certainly, the service data may also include other fields.

The functional interfaces configured for the background service module include at least the service data acquisition interface, which is configured to inquire corresponding service data from the service database in response to the service data calling request sent by the service request end, and package the service data into an entity class object according to a predefined interface return format, and the entity class object includes at least the service code field. Specifically, a user may send the service data calling request to the service module through the service request end, where the service data calling request includes an inquiring condition; and the background service module inquires the service data of the service database based on the inquiring condition in the received service data calling request, obtains an inquiring result, and then packages the inquiring result according to an interface return format of the service data acquisition interface configured by the background service module to obtain the entity class object.

In the embodiment of the present disclosure, the interface return format of the service data acquisition interface is designed in advance, the interface return format defines a specific format of the entity class object, such as which attribute fields included, a data type of each field, and the like, and the interface return format also defines that a customized serialization annotation is to be automatically added to a preset service code field (a service code field set as required) in a process of packaging the inquiring result. A specific content of the customized serialized annotation is written into a code used for defining the interface return format of the service data acquisition interface in advance. A specific code of the customized serialized annotation depends on the serialization framework used by the service system, and the customized serialized annotation adopts a standard annotation format provided by the serialization framework.

Figure 4:
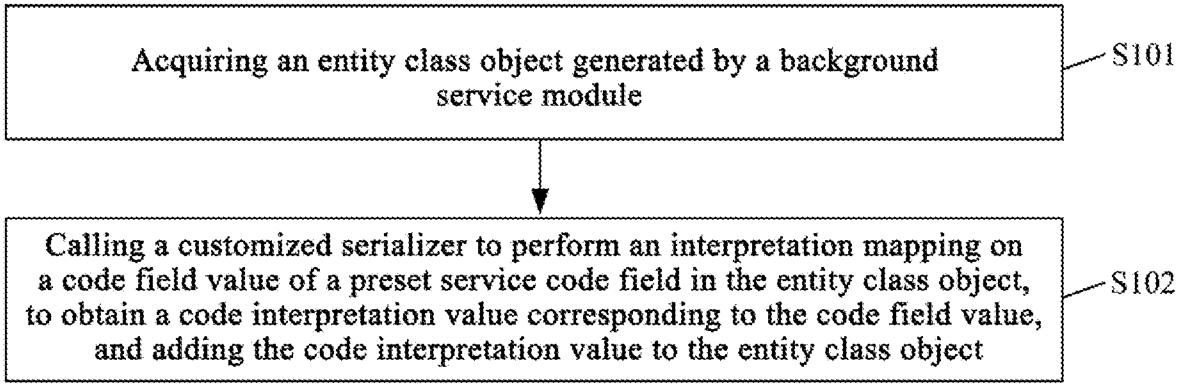
FIG. 4 is a flowchart of a service code interpretation weaving method according to an embodiment of the present disclosure.

FIG. 4 is a flowchart of a service code interpretation weaving method according to an embodiment of the present disclosure. As shown in FIG. 4, the service code interpretation weaving method includes:

Step S101, acquiring an entity class object generated by a background service module.

In the embodiment of the present disclosure, the entity class object (Object) refers to an instance of an entity class with a preconfigured interface return format fed back by an interface. In some embodiments, the preset service code field contained in the entity class object is configured with the customized serialization annotation that specifies a customized serializer.

In the embodiment of the present disclosure, the interface return format of the service data acquisition interface configured by the background service module is designed in advance, so that the service code field in the entity class object generated by the data acquisition interface is configured with the customized serialization annotation that specifies a customized serializer. The customized serializer is a serializer written and defined by a user according to his/her needs, and is registered in the serialization module in advance and used as a component in the serialization module and may be used for performing data conversion and other operations on the object.

Unlike the conventional serializers included in the serialization framework (i.e., the serialization module), the "customized serializer" provided in the embodiments of the present disclosure is a new component that is designed in advance and added and registered in the serialization module, and the customized serializers not only have the conventional serialization function, but also have the functions of performing the interpretation mapping on the preset service code field in the entity class object and adding the interpretation mapping to the entity class object, and the details may be referred to the following description.

Step S102, calling a customized serializer to perform an interpretation mapping on a code field value of a preset service code field in the entity class object, to obtain a code interpretation value corresponding to the code field value, and adding the code interpretation value to the entity class object.

Step S101 and step 102 are performed by the serialization module of the service system. Specifically, the serialization module includes an interception calling unit which monitors the data acquisition interface in real time, and may intercept the entity class object generated by the data acquisition interface of the background service module when it is monitored that the data acquisition interface of the background service module generates the entity class object, and calls the customized serializer specified by the customized serialization annotation when it is detected that the entity class object includes the customized serialization annotation, to further process the entity class object by the customized serializer.

Specifically, the customized serializer firstly acquires the code field value of the service code field configured with the customized serialization annotation, and then performs the interpretation mapping processing on the code field value to obtain the code interpretation value corresponding to the code field value.

It should be noted that the service code field in the embodiment of the present disclosure is a unique identifier of a service dictionary, and the code field value of the service code field may generally be composed of numbers or letters; the code interpretation value is interpretation information of the corresponding code field value, and may include English, Chinese, numeral, symbol, and the like.

As an example, when encoding a commodity category, the service code field is "category", a value range of the code field value is "01" to "99", and the following table 1 is a table of a mapping relationship between the code field value and the code interpretation value of the commodity category.

TABLE 1

A table of a mapping relationship between the code field value and the code interpretation value of the commodity category

| Code field value | Code interpretation value |
|---|---|
| 01 | Fruit |
| 02 | Drinks |
| 03 | Electrical appliances |
| 04 | Sports |
| 05 | Toys |
| 06 | Wash supplies |
| 07 | Snacks |
| . . . | . . . |

In practical application, operations such as adding, deleting and modifying the code field value and/or the code interpretation value may be performed according to actual needs.

Compared with the related art shown in FIG. 1, in the technical solution of the present disclosure, the generation of the code interpretation value is performed in the service system, so that the coupling degree between the service request end and the service system is reduced; meanwhile, the mapping data does not need to be acquired and stored by the service request end, so that the operation of updating the mapping data in the service request end is not needed, the data consistency of the system can be improved to a certain extent, and the maintenance cost can be reduced.

Compared with the related art shown in FIG. 2, in the technical solution of the present disclosure, the generation of the code field value is performed in the background service module, the generation of the code interpretation value is performed in the serialization module, and the interpretation mapping is performed on the code field value in the entity class object provided by the background service module through the customized serializer; that is, the customized serializer may dynamically generate corresponding code interpretation value based on the code field value within the entity class object. The code interpretation value corresponding to the code field value in the entity class object may be dynamically generated through the customized serializer, so that the code interpretation value does not need to be specified in the entity class object provided by the background service module, and therefore it is unnecessary to associate the service data and the mapping data with each other. In this way, the service data and the mapping data are decoupled from each other, and data maintenance in the later period is facilitated. In addition, the entity class object including the service code field and the customized annotation is generated through the background service module, then the customized serializer is called through the serialization module to perform the interpretation mapping on the code field value, and the code field value is added into the entity class object, so that the running process is fast, and the overall performance of the system is good.

Based on the above, the technical solution of the present disclosure has the characteristics of high data consistency, good maintainability, low coupling degree and good performance.

In some embodiments, when the code field value and the code interpretation value corresponding to the code field value in the entity class object are not recorded in the mapping data, the customized serialization module may add information on a failure of the interpretation mapping on the preset service code field value to the entity class object, to remind the service request end of the failure of the interpretation mapping on the preset service code field value in the entity class object; meanwhile, the customized serialization module may also send the related information for describing the failure of the interpretation mapping to the service request end with the modification authority for the mapping data, to remind the service request end with the modification authority for the mapping data of updating the mapping data in the mapping database.

In some embodiments, the serialization module is a jackson serialization module, the customized serialization annotation is the @JsonSerialize annotation, and the customized serializer is a customized jackson serializer. That is, the serialization framework used by the service system is the Json serialization framework. The Json serialization framework has the advantages of good readability, simple and easy to use, good expandability, good compatibility, cross-language (structured data may be exchanged among multiple languages) and the like.

The entity class object generated by the background service module is a JAVA entity class object, and the JAVA entity class object contains @JsonSerialize annotation. After intercepting the entity class object generated by the background service module, the serialization module converts the JAVA entity class object into a Json entity class object through a transfer function JSONObject json=JSONObject.fromObject(obj) of the Json serialization framework. Then, the @JsonSerialize annotation in the Json entity class object is identified, and a corresponding customized jackson serializer is called according to the content of the @JsonSerialize annotation to further process the Json entity class object.

Alternatively, the serialization modules in the present disclosure may alternatively be other types of serialization modules, and the types of the customized serialization annotations and the customized serializers may alternatively be changed accordingly, which is not enumerated.

In some embodiments, step S102 specifically includes: acquiring the code interpretation value corresponding to the code field value according to pre-stored mapping data, where the mapping data include different code field values and code interpretation values corresponding to the code field values. Optionally, the mapping data is pre-stored in a cache. That is, the customized serializer may perform the interpretation mapping on the code field value according to the mapping data stored in the cache.

In some embodiments, the service system caches the mapping data in advance; the customized serializer performs the interpretation mapping on the code field value by calling the mapping data in the cache. In the embodiment of the present disclosure, the mapping data is pre-stored in the cache. The running speed of the data in the cache is extremely high, so that the mapping speed can be effectively increased and the system performance is improved by calling the mapping data in the cache to perform the interpretation mapping on the code field value.

Figure 5:
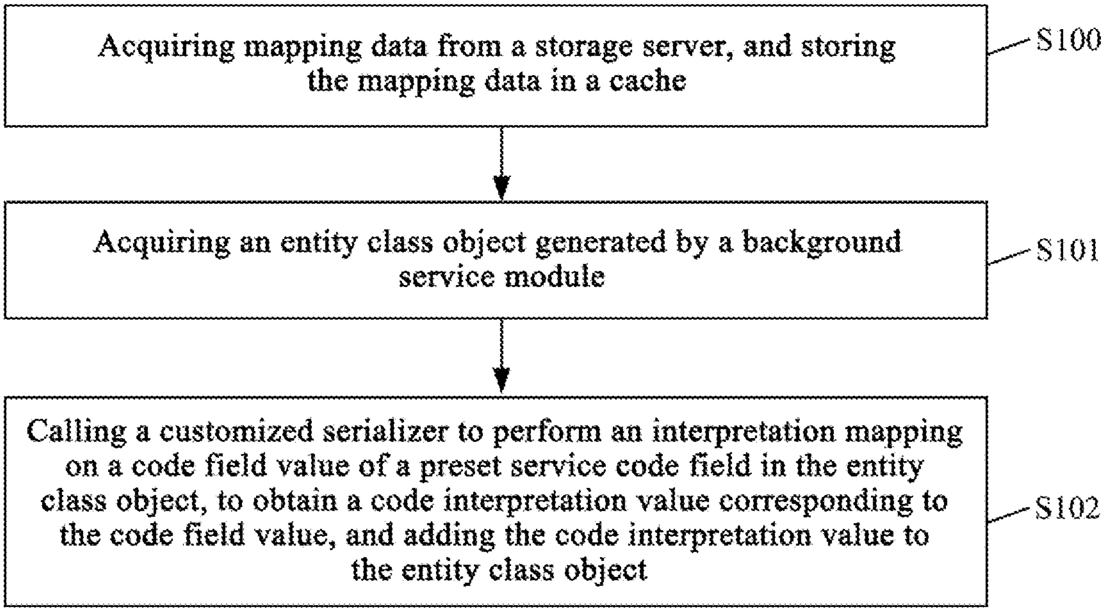
FIG. 5 is a flowchart of another service code interpretation weaving method according to an embodiment of the present disclosure.

FIG. 5 is a flowchart of another service code interpretation weaving method according to an embodiment of the present disclosure. As shown in FIG. 5, the method shown in FIG. 5 further includes step S100 before step S101 in addition to step S101 and step S102 described above.

Step S100, acquiring mapping data from a storage server, and storing the mapping data in a cache.

In the embodiment of the present disclosure, the mapping database is provided in the storage server, so that mapping data is stored in the storage server; where the storage server may be formed by a distributed storage device cluster.

Step S100 may be performed by a maintenance module of the service system. When the service system is down or restarted so that the data in the cache is empty, the maintenance module may acquire the mapping data from the storage server again and store the mapping data in the cache.

Figure 6:
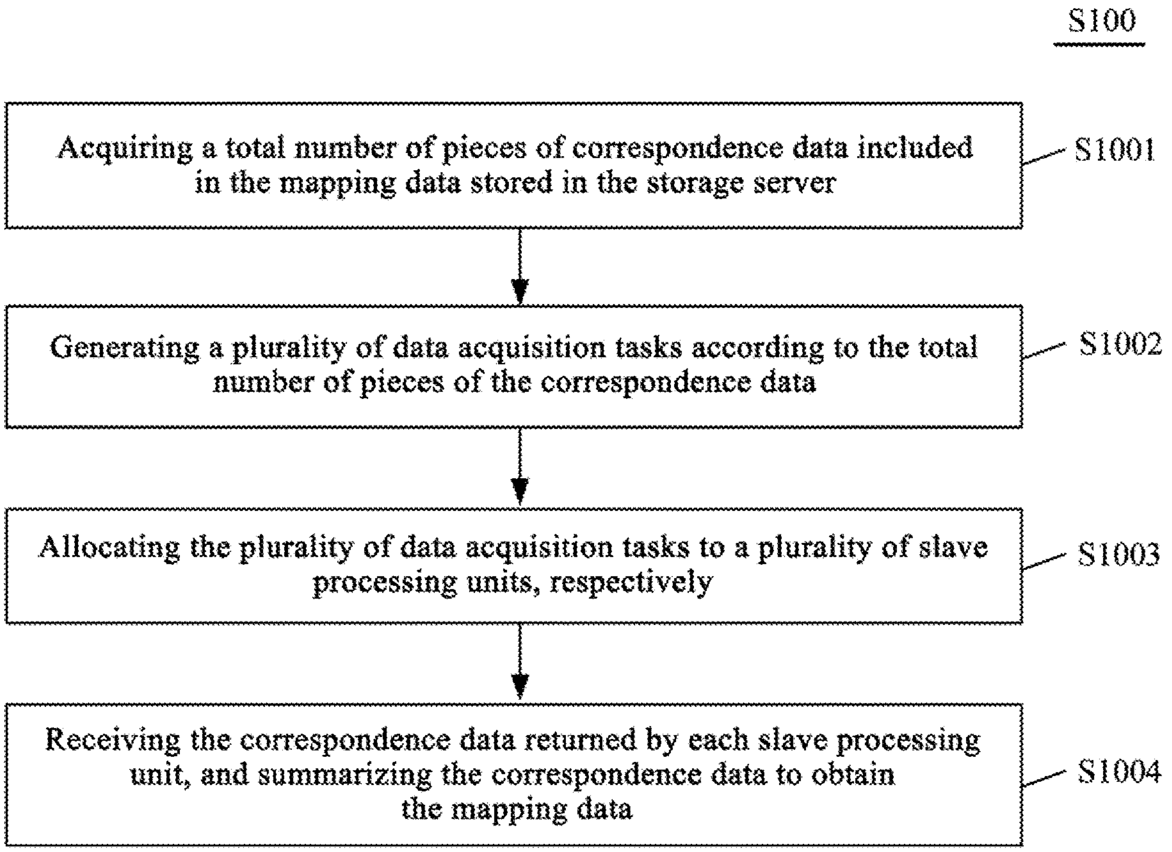
FIG. 6 is a flowchart of an alternative implementation of step S100 according to an embodiment of the present disclosure.

FIG. 6 is a flowchart of an alternative implementation of step S100 according to an embodiment of the present disclosure. As shown in FIG. 6, in some embodiments, step S100 includes:

Step S1001, acquiring a total number of pieces of correspondence data included in the mapping data stored in the storage server, where one piece of correspondence data includes one code field value and a code interpretation value corresponding to the code field value.

Optionally, a name of the database (essentially, a data table) corresponding to the mapping data may be used as an index, and the total number of pieces of the correspondence data included in the mapping database may be inquired from the storage server.

Step S1002, generating a plurality of data acquisition tasks according to the total number of pieces of the correspondence data.

Figure 7:
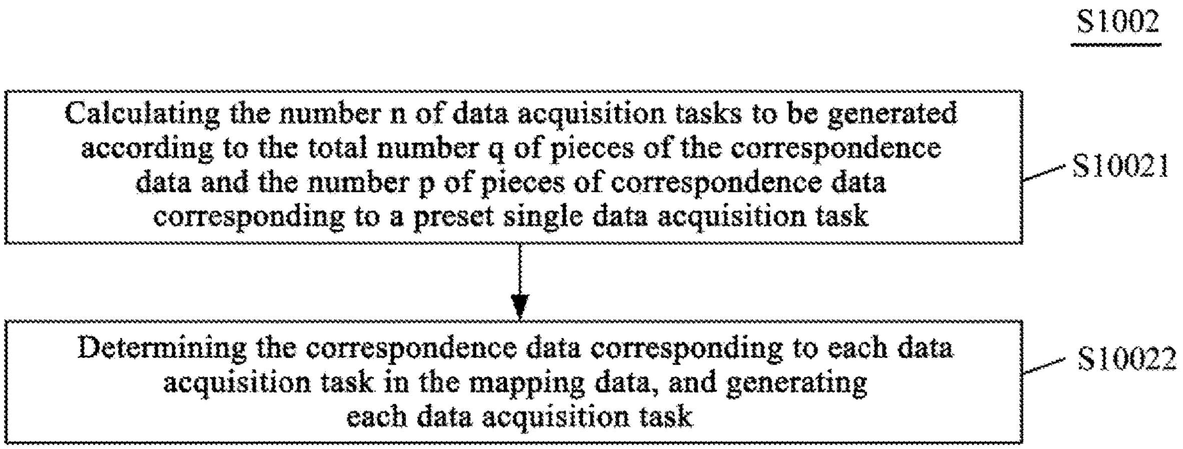
FIG. 7 is a flowchart of an alternative implementation of step S1002 according to an embodiment of the present disclosure.

FIG. 7 is a flowchart of an alternative implementation of step S1002 according to an embodiment of the present disclosure. As shown in FIG. 7, in some embodiments, step S1002 includes:

Step S10021, calculating the number n of data acquisition tasks to be generated according to the total number q of pieces of the correspondence data and the number p of pieces of correspondence data corresponding to a preset single data acquisition task.

where $$n = \left\lceil \frac{q}{p} \right\rceil, \text{ and } \left\lceil \frac{q}{p} \right\rceil$$

indicates an upward-rounded value of a quotient of q divided by p. The specific value of p may be set and adjusted according to actual needs, for example, a value of n is 10, 100, 1000, or the like.

Step S10022, determining the correspondence data corresponding to each data acquisition task in the mapping data, and generating each data acquisition task, where the correspondence data corresponding to different data acquisition tasks are different.

After the number n of the data acquisition tasks is determined, the correspondence data corresponding to each data acquisition task is determined. As an example, after the number n of data acquisition tasks is determined, the mapping database including the mapping data may be divided into n partitions according to the number p of pieces of correspondence data corresponding to the preset single data acquisition task. At this time, the first partition corresponds to the first to the $p^{th}$ pieces of correspondence data in the mapping database; the second partition corresponds to the $(p+1)^{th}$ to the $(2p)^{th}$ pieces of correspondence data in the mapping database; . . . ; the $(n-1)^{th}$ partition corresponds to the $((n-2)\times p+1)^{th}$ to the $((n-1)\times p)^{th}$ pieces of correspondence data in the mapping database; the nth partition corresponds to the $((n-1)\times p+1)^{th}$ to the $q^{th}$ pieces of correspondence data in the mapping database. Then, a one-to-one correspondence relationship between the n data acquisition tasks and the n partitions is established, thereby determining correspondence data of each data acquisition task in the mapping data, and generating corresponding data acquisition tasks.

Alternatively, in the embodiment of the present disclosure, the correspondence data corresponding to each data acquisition task in the mapping data may also be allocated in other manners, which is not limited in the present disclosure, as long as the total number of pieces of the correspondence data corresponding to all the data acquisition tasks may form the complete mapping data.

Step S1003, allocating the plurality of data acquisition tasks to a plurality of slave processing units, respectively, so that each slave processing unit may acquire correspondence data corresponding to the data acquisition task from the storage server according to the received data acquisition task.

Figure 8:
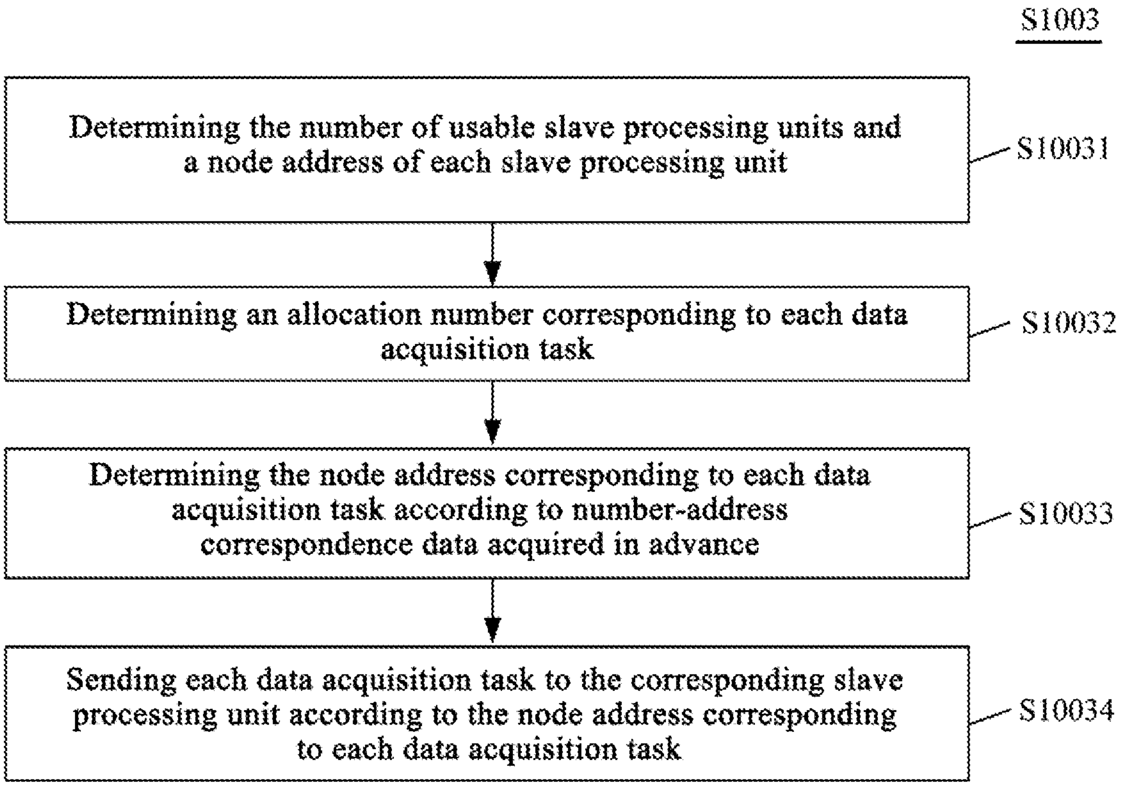
FIG. 8 is a flowchart of an alternative implementation of step S1003 according to an embodiment of the present disclosure.

FIG. 8 is a flowchart of an alternative implementation of step S1003 according to an embodiment of the present disclosure. As shown in FIG. 8, in some embodiments, step S1003 includes:

Step S10031, determining the number of usable slave processing units and a node address of each slave processing unit.

Step S10032, determining an allocation number corresponding to each data acquisition task.

The allocation number corresponding to the $i^{th}$ data acquisition task is S_i=Hash(M_i) % j, M_i represents a task number corresponding to the $i^{th}$ data acquisition task, j represents the number of usable slave processing units, Hash (M_i) represents the Hash operation on the task number M_i corresponding to the $i^{th}$ data acquisition task, and % represents a remainder operation, $1\leq i\leq n$.

Step S10033, determining the node address corresponding to each data acquisition task according to number-address correspondence data (the data of a correspondence between a number and an address) acquired in advance.

The number-address correspondence data include different allocation numbers and node addresses corresponding to the different allocation numbers.

It should be noted that the above technical means for determining the slave processing units allocated to each data acquisition task based on the Hash operation and the remainder operation is only one optional implementation in the present disclosure, and does not limit the technical solution in the present disclosure. In the embodiment of the present disclosure, the plurality of data acquisition tasks may be allocated to the plurality of slave processing units based on other allocation manners, for example, a random allocation, an average allocation, or an allocation based on a balancing consideration for the load of the plurality of slave processing units.

Step S10034, sending each data acquisition task to the corresponding slave processing unit according to the node address corresponding to each data acquisition task.

Step S1004, receiving the correspondence data returned by each slave processing unit, and summarizing the correspondence data to obtain the mapping data.

Each slave processing unit acquires correspondence data corresponding to the data acquisition task from the storage server according to the received data acquisition task, and feeds the acquired correspondence data back to a main processing unit, which summarizes the correspondence data returned by the slave processing unit to obtain complete mapping data.

In some embodiments, firstly, the slave processing unit performs a serialization processing on the correspondence data obtained after processing the data acquisition task through a Protostuff serialization component, to convert the correspondence data into a binary data stream, and then sends the binary data stream to the main processing unit. Since the data amount of the binary data stream is relatively small, a fast transmission can be realized. After receiving the binary data stream sent by the slave processing unit, the main processing unit performs a deserialization processing on the Protosteff serialization component to convert the binary data stream into the correspondence data.

It should be noted that the processing speed of the maintenance module for acquiring the mapping data can be effectively increased by performing parallel processing on the data acquisition task through the plurality of slave processing units.

Figure 9:
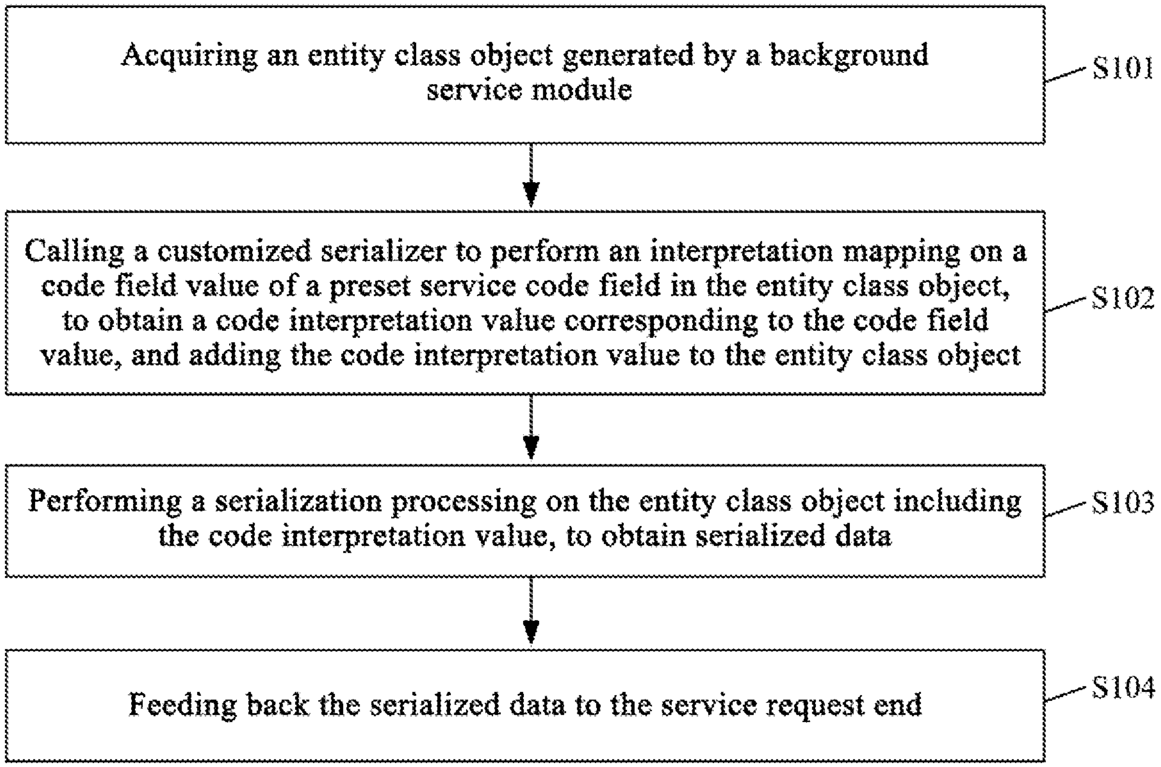
FIG. 9 is a flowchart of another service code interpretation weaving method according to an embodiment of the present disclosure.

FIG. 9 is a flowchart of another service code interpretation weaving method according to an embodiment of the present disclosure. As shown in FIG. 9, the method shown in FIG. 9 includes not only the above step S101 and step S102, but also step S103 and step S104, and only step S103 and step S104 are described in detail below.

Step S103, performing a serialization processing on the entity class object including the code interpretation value, to obtain serialized data.

Step S104, feeding back the serialized data to the service request end.

Step S103 and step S104 are also performed by the serialization module of the service system.

Specifically, the customized serializer performs the serialization processing on the entity class object woven with the code interpretation value, to obtain the serialized data, and then sends the serialized data to the service request end. Subsequently, the service request end performs the deserialization processing on the received serialized data, so that the entity class object may be obtained by restoring, and further the service data to be inquired (including the code field value of the preset service coded field and the corresponding code interpretation value) may be obtained.

In the embodiment of the present disclosure, the purpose of serializing data is to store the entity class object across platforms and transmit the entity class object over a network (data may also be transferred in a distributed application system), or store the entity class object on a hard disk in a sequence of binary bytes.

In a remote communication, two "ends" may send various types of data therebetween. Whatever the type of data, the data is transmitted over the network in the binary sequence; a sender needs to convert the type of data (object) into the sequence of binary bytes to transmit the data over the network; a receiver needs to restore the sequence of bytes to the object. The way of the cross-platform storage and network transmission is input/output (I/O), and the data format supported by I/O is a byte array. Therefore, it is necessary to serialize data to be subjected to the "cross-platform storage" and the "network transmission". Essentially, in the way of the storage and the network transmission, it is necessary to save an object state into a byte format recognized across platforms, and then other platforms may analyze and restore object information through byte information. After the deserialization processing, the receiver may convert the data stored in the character sequence into the object information which may be identified.

As an example, the serialization framework used by the service system is the Json serialization framework, the customized jackson serializer weaves the code interpretation value into the Json entity class object, then calls the Json entity class object into a Json character string (namely a sequence of bytes) through a transfer function Stringstr=json.toString( ), and send the Json character string to the service request end.

Under the condition that the serialization framework used by the service system is a Json serialization framework, the service request end also supports the Json serialization framework, to ensure that the service request end can convert the Json character string into the JAVA entity class object through the deserialization processing. Specifically, a related program of the Json serialization framework is installed in the service request end, the service request end may convert the Json character string into the Json entity class object through an deserialization component of the Json serialization framework, then convert the Json entity class object into the JAVA entity class object, and obtain the service data (including the code field value and the code interpretation value) included in the JAVA entity class object.

It should be noted that in the embodiment of the present disclosure, the serialization processing is a process for converting an entity class object into a sequence of bytes, and through the serialization processing, integrity and transferability of the entity class object can be ensured when the object is transferred and stored, and the entity class object is converted into an ordered byte stream to be transmitted over a network or stored in a local file. The deserialization processing is a process of restoring a sequence of bytes into an entity class object (for example, the Json character string is converted into the Json entity class object, and then the Json entity class object is converted into the JAVA entity class object), and the object is reconstructed through the deserialization processing according to an object state and description information stored in the byte stream.

In some embodiments, the service request end is configured with a request result display interface. After the JAVA entity class object is obtained by the service request end through the deserialization processing, the service data content included in the JAVA entity class object may be displayed according to actual needs. At this time, the user may acquire the relevant content (including the code field value and the corresponding code interpretation value) of the inquired service data through the display interface of the service request end.

In the process of actually implementing the technical solution of the present disclosure, only the serialization framework used by the service system needs to be improved (including adding the "interception calling unit" and the "registration customized serializer" on the basis of the conventional serialization framework), and the serialization framework used by the service request end does not need to be improved, so that the technical solution of the present disclosure is low in implementation difficulty and is convenient to implement.

Figure 10:
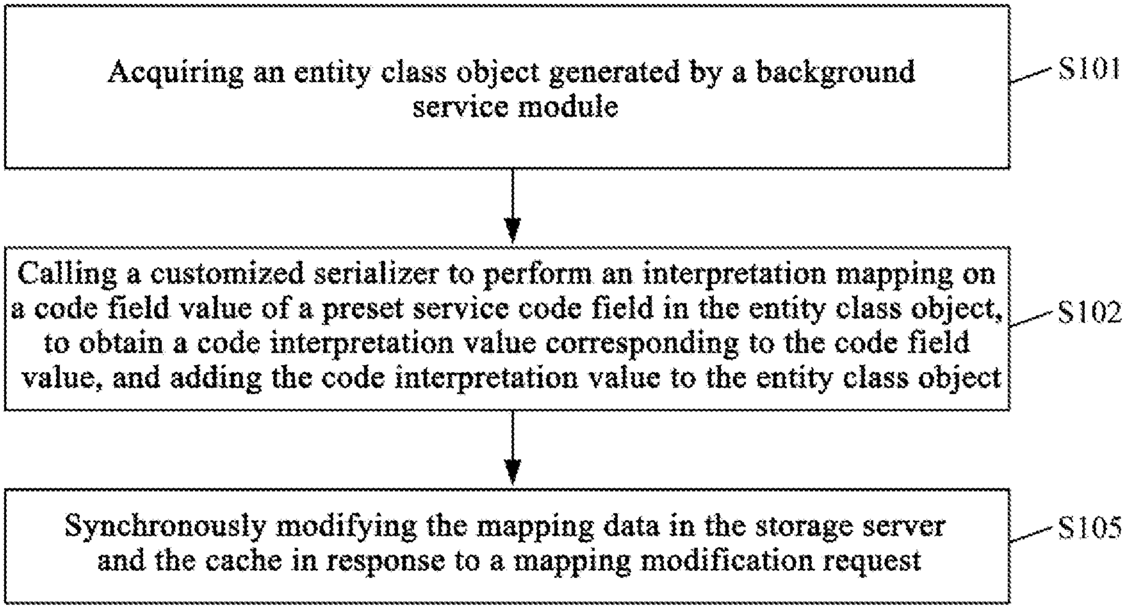
FIG. 10 is a flowchart of another service code interpretation weaving method according to an embodiment of the present disclosure.

FIG. 10 is a flowchart of another service code interpretation weaving method according to an embodiment of the present disclosure. As shown in FIG. 10, the method shown in FIG. 10 includes not only the above step S101 and step S102, but also step S105, and only step S105 is described in detail below.

Step S105, synchronously modifying the mapping data in the storage server and the cache in response to a mapping modification request.

The modifying the mapping data may include adding one or more pieces of correspondence data between the code field value and the code interpretation value, modifying the code interpretation values corresponding to one or more code field values, modifying the code field values corresponding to one or more code interpretation values, deleting one or more pieces of correspondence data between the code field value and the code interpretation value, or the like.

Step S105 is performed by the maintenance module. After the mapping data in the mapping database is modified, the mapping data in the cache may be synchronously modified to ensure the consistency of the mapping data in the mapping database and the cache.

It should be noted that when only the mapping data is stored in the storage server or the cache of the service system, in step S105, only the mapping data in the storage server or the cache needs to be modified accordingly.

In the embodiment of the present disclosure, because the mapping data is only stored in the service system side, and is not stored in the service request end side, the technical solution of the present disclosure does not include the step of synchronously updating the mapping data locally stored in the service request end after the mapping data in the background service module is modified, as involved in the related art, thereby reducing the maintenance cost.

It should be noted that FIG. 10 only exemplarily shows a case where step S105 is performed after step S101 and step S102, which is only exemplary. In the embodiment of the present disclosure, the execution sequence between step S105 and other steps is not limited, for example, step S105 may be executed before step S101, or between step S101 and step S102.

In addition, the technical solutions obtained by combining different steps in the above embodiments should also belong to the protection scope of the present disclosure. For example, in some embodiments, all the steps S100, S101, S102, S103, S104, and S105 may be included.

Figure 11:
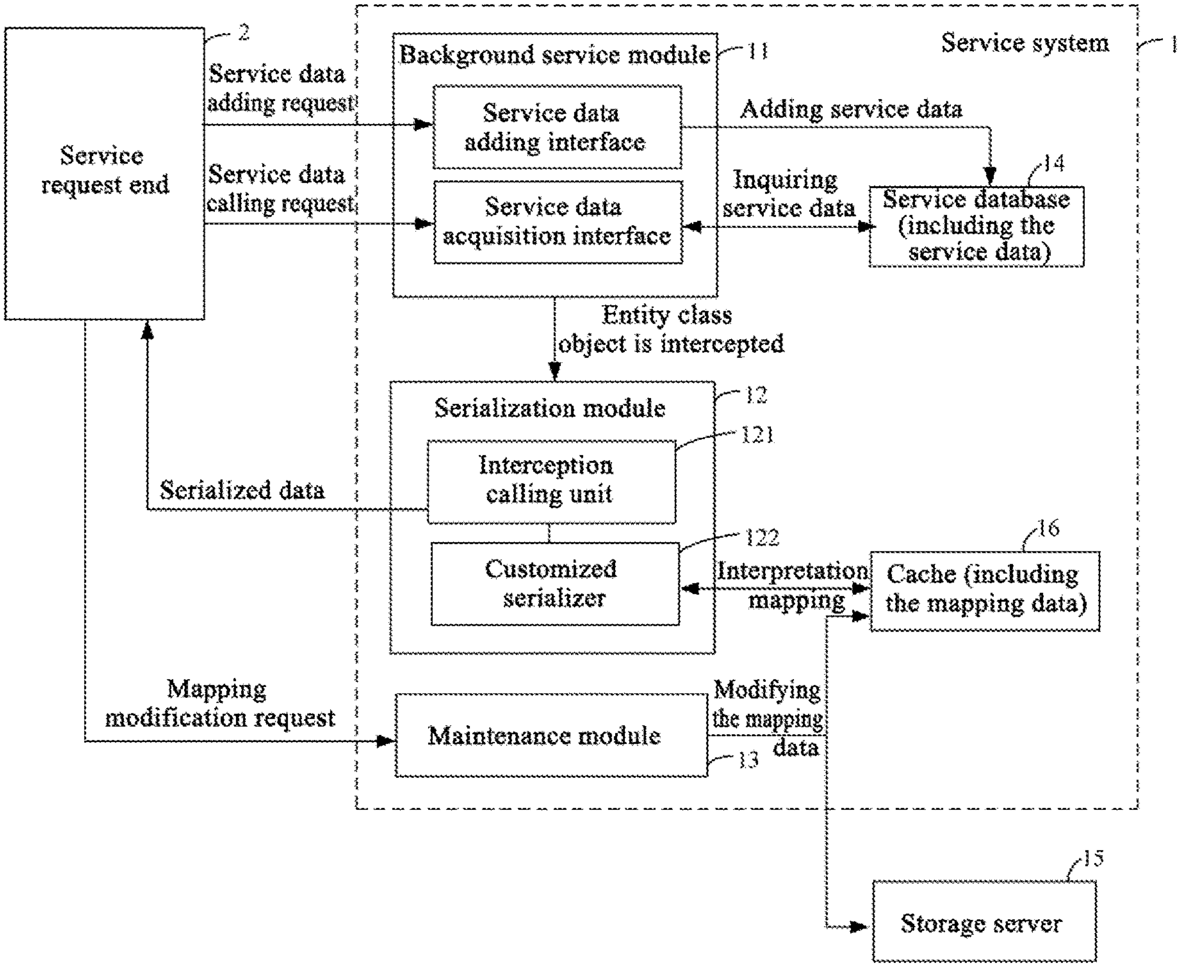
FIG. 11 is a block diagram of a structure of a service system according to an embodiment of the present disclosure.
Figure 12:
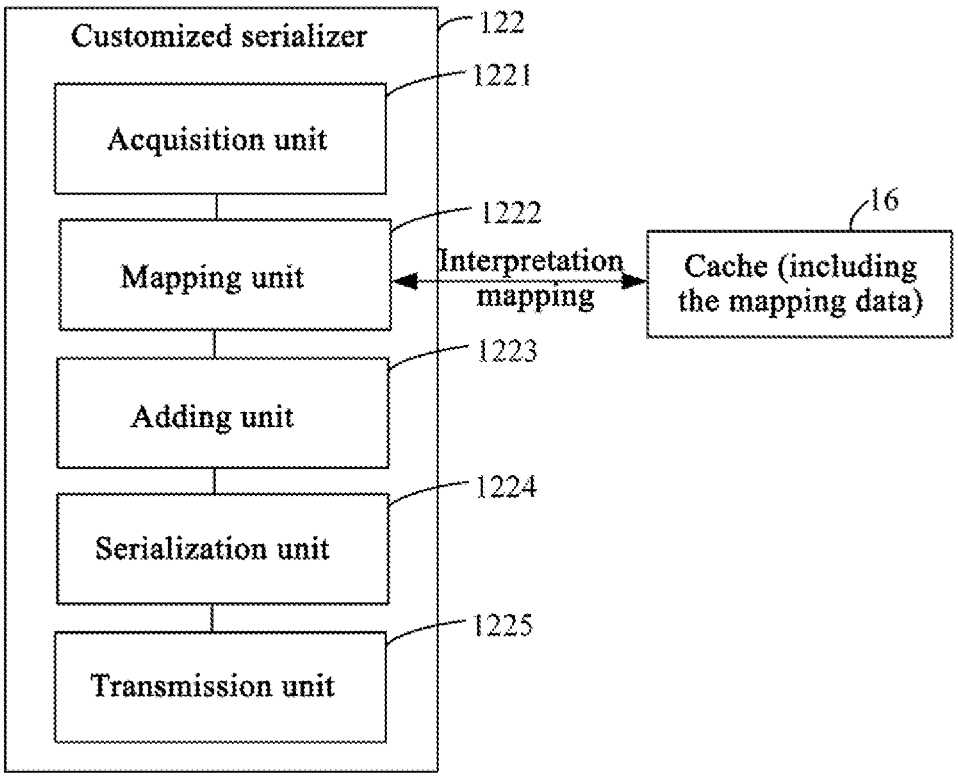
FIG. 12 is a block diagram of a structure of a customized serializer of FIG. 11.
Figure 13:
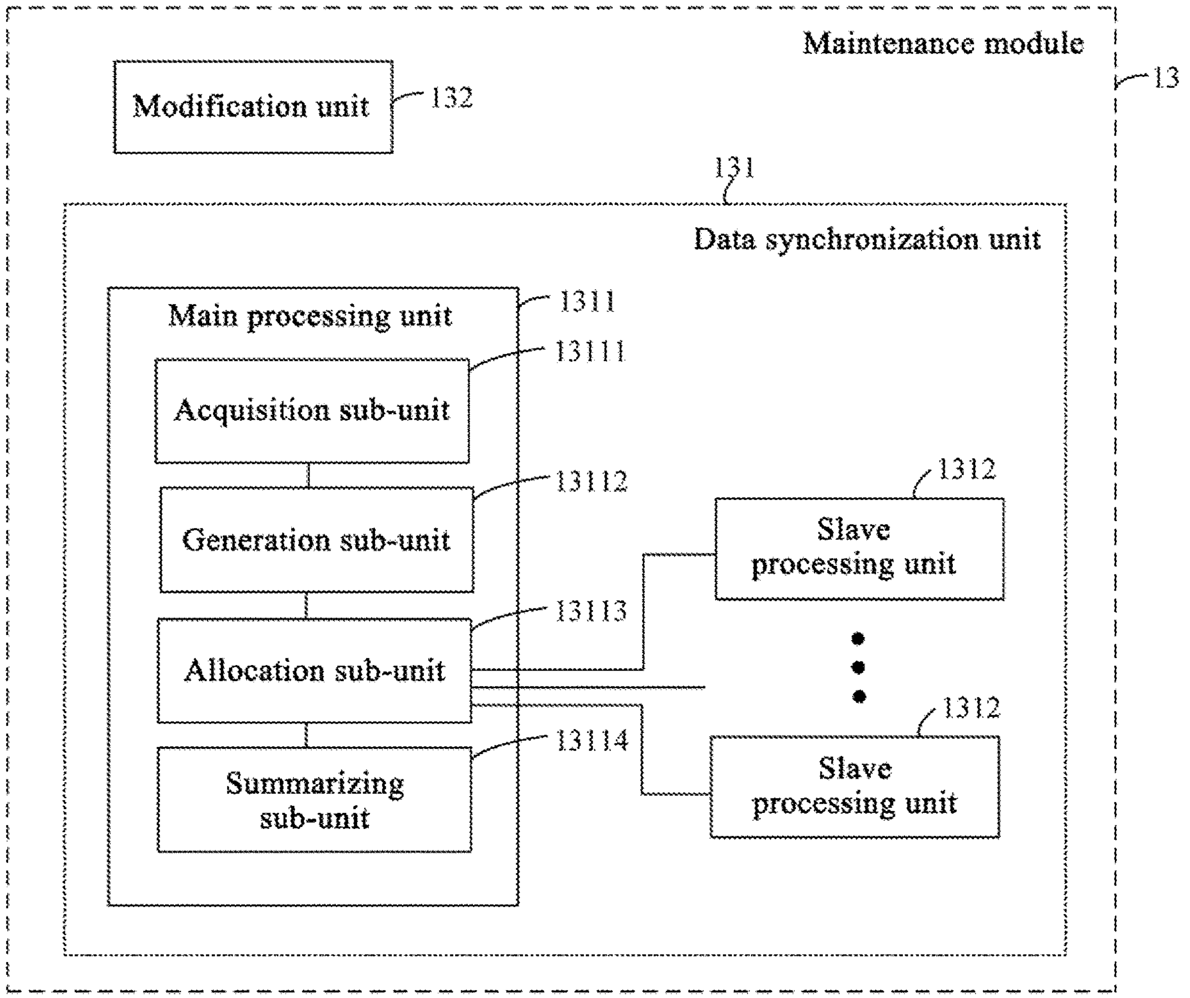
FIG. 13 is a block diagram of a structure of a maintenance module according to an embodiment of the present disclosure.

Based on the same inventive concept, the embodiment of the present disclosure further provides a service system, which is the above service processing end. FIG. 11 is a block diagram of a structure of a service system according to an embodiment of the present disclosure; FIG. 12 is a block diagram of a structure of a customized serializer of FIG. 11. FIG. 13 is a block diagram of a structure of a maintenance module according to an embodiment of the present disclosure. As shown in FIG. 11 to FIG. 13, the service system 1 includes: a background service module 11 and a serialization module 12, where the background service module 1 is configured with a service data acquisition interface, and the serialization module 12 includes an interception calling unit 121 and a customized serializer 122 which is registered in the serialization module 12 in advance.

The service data acquisition interface is configured to inquire corresponding service data from a service database 14 in response to a service data calling request sent by a service request end, to enable the background service module to generate a corresponding entity class object, where a preset service code field included in the entity class object is configured with a customized serialization annotation which specifies a customized serializer.

The interception calling unit 121 is configured to acquire an entity class object generated by the background service module 11.

The customized serializer 122 is configured to perform an interpretation mapping on a code field value of the preset service code field, to obtain a code interpretation value corresponding to the code field value, and add the code interpretation value to the entity class object.

In some embodiments, the preset service code field included in the entity class object is configured with the customized serialization annotation which specifies the customized serializer. The interception calling unit 121 is further configured to detect the acquired entity class object, and call the customized serializer 122 specified by the customized serialization annotation when it is detected that the entity class object includes the customized serialization annotation.

In some embodiments, the serialization module 12 is a jackson serialization module and the customized serialization annotation is @JsonSerialize annotation; the customized serializer is a customized jackson serializer.

In some embodiments, referring to FIG. 12, the customized serializer 122 includes: an acquisition unit 1221, a mapping unit 1222, and an adding unit 1223. The acquisition unit 1221 is configured to acquire the code field value of the preset service code field; the mapping unit 1222 is configured to perform the interpretation mapping on the code field value to obtain the code interpretation value corresponding to the code field value; the adding unit 1223 is configured to add the code interpretation value to the entity class object. When the customized serializer 122 is a customized jackson serializer, the adding unit 1223 is specifically a jackson generator.

Further optionally, the mapping unit 1222 is specifically configured to acquire the code interpretation value corresponding to the code field value according to pre-stored mapping data, where the mapping data include different code field values and code interpretation values corresponding to the code field values.

In some embodiments, the mapping data is pre-stored in a cache 16. Further optionally, the mapping unit 1222 is specifically configured to acquire the code interpretation value corresponding to the code field value according to the mapping data stored in the cache 16. In the embodiment of the present disclosure, the mapping data is pre-stored in the cache 16. The running speed of the data in the cache 16 is extremely high, so that the mapping speed can be effectively increased and the system performance is improved by calling the mapping data in the cache 16 to perform the interpretation mapping on the code field value.

With continued reference to FIGS. 11 and 13, the service system further includes: a maintenance module 13, including: a data synchronization unit 131 configured to acquire the mapping data from a storage server 15 and store the mapping data in the cache 16.

In some embodiments, the maintenance module 13 further includes: a modification unit 132 configured to synchronously modify the mapping data in the storage server 15 and the cache 16 in response to a mapping modification request.

Referring to FIG. 13, in some embodiments, the data synchronization unit includes: a main processing unit 1311 and a plurality of slave processing units 1312. The main processing unit 1311 includes an acquisition sub-unit 13111, a generation sub-unit 13112, an allocation sub-unit 13113, and a summarizing sub-unit 13114.

The acquisition sub-unit 13111 is configured to acquire a total number of pieces of correspondence data included in the mapping data stored in the storage server, where one piece of correspondence data includes one code field value and a code interpretation value corresponding to the code field value.

The generation sub-unit 13112 is configured to generate a plurality of data acquisition tasks according to the total number of pieces of the correspondence data.

The allocation sub-unit 13113 is configured to allocate the plurality of data acquisition tasks to the plurality of slave processing units, respectively.

The summarizing sub-unit 13114 is configured to receive the correspondence data returned by each slave processing unit, and summarize the correspondence data to obtain the mapping data.

Each slave processing unit 1312 is configured to acquire the correspondence data corresponding to the data acquisition task from the storage server according to the received data acquisition task, and feed back the acquired correspondence data to the main processing unit.

In some embodiments, the generation sub-unit 13112 is specifically configured to: calculate the number n of data acquisition tasks to be generated according to the total number q of pieces of the correspondence data and the number p of pieces of correspondence data corresponding to a preset single data acquisition task, where $$n = \left\lceil \frac{q}{p} \right\rceil, \text{ and } \left\lceil \frac{q}{p} \right\rceil$$

indicates an upward-rounded value of a quotient of q divided by p; determine the correspondence data corresponding to each data acquisition task in the mapping data, and generate each data acquisition task, where the correspondence data corresponding to different data acquisition tasks are different.

In some embodiments, the allocation sub-unit 13113 is specifically configured to: determine the number of usable slave processing units 132 and a node address of each slave processing unit; determine an allocation number corresponding to each data acquisition task, where the allocation number corresponding to the $i^{th}$ data acquisition task is S_i=Hash (M_i) % j, M_i represents a task number corresponding to the $i^{th}$ data acquisition task, j represents the number of usable slave processing units, Hash (M_i) represents the Hash operation on the task number M_i corresponding to the $i^{th}$ data acquisition task, and % represents a remainder operation, $1 \leq i \leq n$; determine the node address corresponding to each data acquisition task according to number-address correspondence data acquired in advance, where the number-address correspondence data include different allocation numbers and node addresses corresponding to the different allocation numbers; and send each data acquisition task to the corresponding slave processing unit 132 according to the node address corresponding to each data acquisition task.

For specific descriptions of the units and the sub-units in the maintenance module 13, reference may be made to corresponding contents in the foregoing method embodiments, and details are not described here again.

Referring again to FIG. 12, in some embodiments, the customized serializer 122 further includes: a serialization unit 1224 and a transmission unit 1225. The serialization unit 1224 is configured to perform a serialization processing on the entity class object including the code interpretation value to obtain serialized data; the transmission unit 1225 is configured to feed back the serialized data to the service request end 2.

In some embodiments, the background service module 11 is further configured with a service data adding interface; the service data adding interface is configured to add service data included in a service data adding request to the service database 14 in response to the service data adding request.

Based on the content described in the foregoing embodiments, it can be seen that the service system of the present disclosure has the characteristics of high data consistency, good maintainability, low coupling degree and good performance.

As a specific application scenario, the service system provided in the foregoing embodiment is a service system including a service classification dictionary code management function, the code field value of the service code field in the service data stored in the service database is a service classification dictionary code, and the service request end (serving as a service module) may quote the service classification dictionary code in the service system to perform a service classification differentiation. Specifically, the service request end may send a service data calling request to the service system, and the service system feeds back a corresponding service classification dictionary code and a corresponding dictionary code interpretation value (i.e., a code interpretation value) to the service request end in response to the request.

By adopting the technical solution of the present disclosure, the coupling between the service classification dictionary code quoted by the service module and the dictionary code interpretation value can be effectively released, so that the service classification dictionary code and the dictionary code interpretation value are separated from each other; in the process of developing the codes of the service modules, a technical developer only needs to quote the service classification dictionary code for the service tables in the database of the service modules without redundant service classification dictionary code interpretation fields in the service tables, so that the problem of consuming a large amount of cost to maintain the service classification dictionary code interpretation fields is solved, the maintainability of the service codes is ensured, the working efficiency of technical development is effectively improved, and unnecessary code development is reduced.

Figure 14:
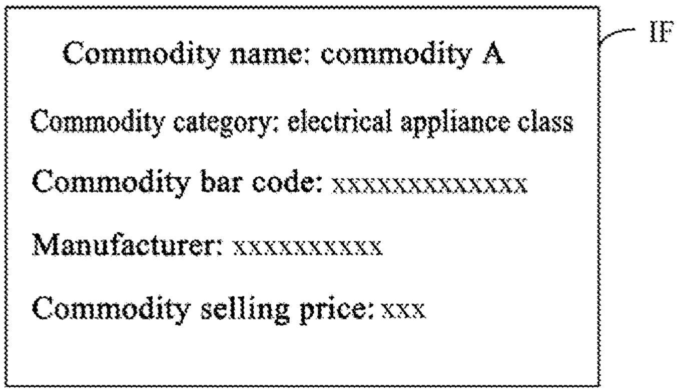
FIG. 14 is a schematic diagram illustrating service data related to a commodity A displayed by a service request end according to an embodiment of the present disclosure.

As another specific application scenario, the service request end faces an individual client for use by the individual client. For example, the individual client may transmit the service data calling request to the service system through the service request end (the WEB end or the APP end), and the service system may feed back corresponding service data to the service request end in response to the service data calling request. Specifically, the individual client requests the service system to call related service data of a commodity A through the individual service request end, the related service data of the commodity A is stored in the service database, and includes a commodity name field, a commodity category field, a commodity bar code field, a manufacturer field, a commodity selling price field, and the like; the commodity category field is a designed preset service code field, and a code field value of the commodity category field in the related service data of the commodity A is assumed to be "03"; the background service module inquires the related service data of the commodity A from the service database (where the code field value of the commodity category field is "03") in response to the service data calling request, and generates an entity class object; the serialization module intercepts the entity class object, calls the customized serializer to perform an interpretation mapping on the code field value "03" of the commodity category field. For example, with the mapping relationship (mapping data) shown in the above table 1, the code interpretation value corresponding to "03" may be determined as "electrical appliance class", the code interpretation value "electrical appliance class" corresponding to "03" is added to the entity class object corresponding to the commodity A, and then the entity class object is fed back to the service request end. FIG. 14 is a schematic diagram illustrating service data related to a commodity A displayed by a service request end according to an embodiment of the present disclosure. As shown in FIG. 14, the service request end may display the information of the related service data of the commodity A to a user through an interface IF, where the information includes the commodity class of the commodity A which is "electrical appliance class", and the information may also include information such as a commodity name, a commodity bar code, a manufacturer, and a commodity selling price.

Figure 15:
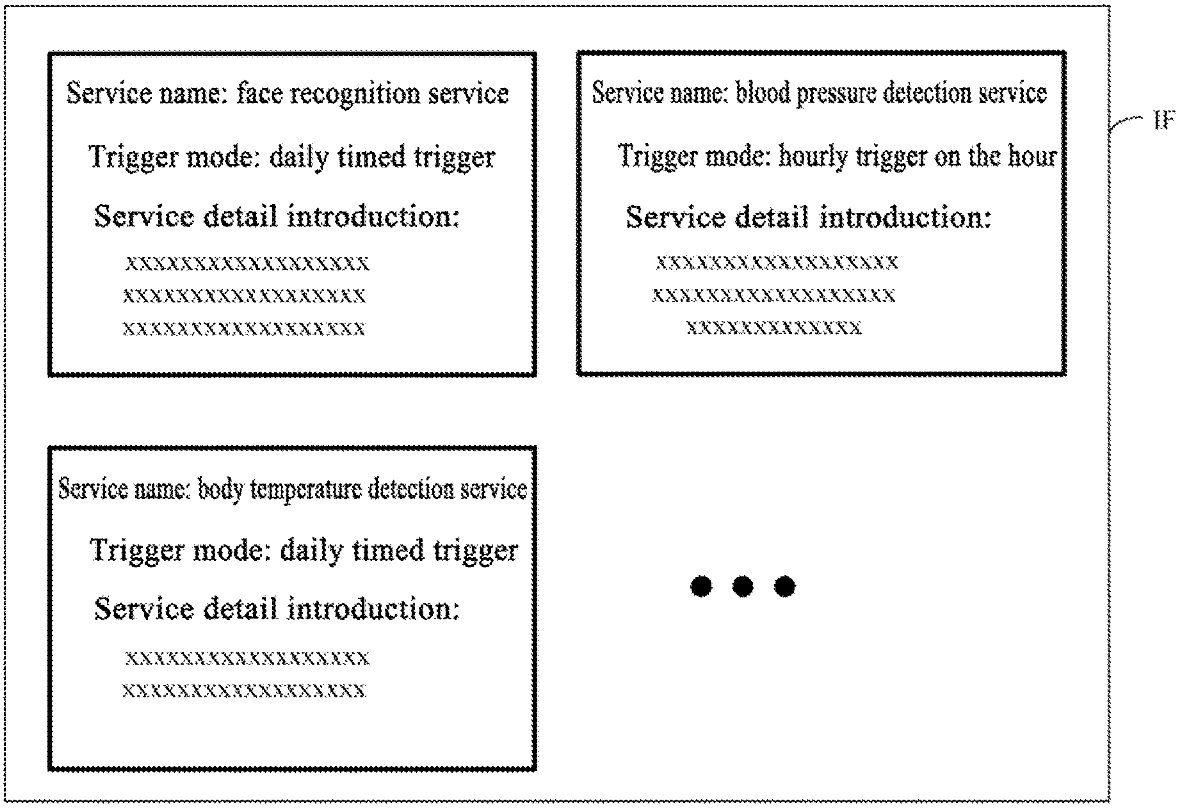
FIG. 15 is a schematic diagram illustrating service data related to a face recognition service, a blood pressure detection service, and a body temperature detection service displayed by a service request end according to an embodiment of the present disclosure.

As another specific application scenario, the service request end faces a service manager, and the specific services may include a face recognition service, a blood pressure detection service, a body temperature detection service, and the like, where service data of each service includes a service name field, a trigger mode field, and a service detail introduction field. The "trigger mode" field is used as the preset service code field; the code field values of the "trigger mode" fields in the service data of the face recognition service, the blood pressure detection service and the body temperature detection service stored in the service database are assumed to be "100", "200" and "100", respectively. The service manager may simultaneously inquire related service data of the face recognition service, the blood pressure detection service and the body temperature detection service through the service request end, and the background service module inquires the service data of the face recognition service, the blood pressure detection service and the body temperature detection service from the service database, respectively, in response to a service data calling request and generates corresponding entity class objects, respectively; the serialization module intercepts all the three entity class objects, calls the customized serializer to perform an interpretation mapping on the code field values of the "trigger mode" fields in the three entity class objects. Assuming that the code interpretation value corresponding to the code field value of "100" in the pre-designed mapping database is "daily timed trigger", and the code interpretation value corresponding to the "200" is "hourly trigger on the hour", the code interpretation value "daily timed trigger" corresponding to the trigger mode field of "100" is added in the entity class object corresponding to the face recognition service; the code interpretation value "hourly trigger on the hour" corresponding to the trigger mode field of "200" is added in the entity class object corresponding to the blood pressure detection service; the code interpretation value "daily timed trigger" corresponding to the trigger mode field of "100" is added in the entity class object corresponding to the body temperature detection service, and then the three entity class objects added with the code interpretation values are fed back to the service request end. FIG. 15 is a schematic diagram illustrating service data related to a face recognition service, a blood pressure detection service, and a body temperature detection service displayed by a service request end according to an embodiment of the present disclosure. As shown in FIG. 15, the service request end may display the information of the related service data of the face recognition service, the blood pressure detection service, and the body temperature detection service to a user through an interface IF, where the information includes information of the trigger mode of each service, and may also include information of the service name, the service detail introduction of each service, and the like.

Based on the same inventive concept, embodiments of the present disclosure further provide a computer-readable storage medium, where a computer executable instruction is stored in the computer-readable storage medium, and when a processor executes the computer executable instruction, the processor implements the technical solution of the service code interpretation weaving method provided in any one of the foregoing embodiments, and the implementation principle and the beneficial effects thereof are similar to those of the service code interpretation weaving method, which can be referred to the implementation principle and the beneficial effects of the service code interpretation weaving method, and are not described herein again.

It will be understood by one of ordinary skill in the art that all or some of the steps of the methods, systems, functional blocks in the systems may be implemented as software, firmware, hardware, or suitable combinations thereof. In a hardware implementation, the division between functional modules referred to in the above description does not necessarily correspond to a division of physical components; for example, one physical component may have multiple functions, or one function or step may be performed by several physical components in cooperation. Some or all of the physical components may be implemented as software executed by a processor, such as a central processing unit, digital signal processor, or microprocessor, or as hardware, or as an integrated circuit, such as an application specific integrated circuit. Such software may be distributed on computer readable media, which may include computer storage media (or non-transitory media) and communication media (or transitory media). The term "computer storage media" includes volatile and nonvolatile, removable and non-removable media implemented in any method or technology for storage of information such as computer readable instructions, data structures, program modules or other data, as is well known to one of ordinary skill in the art. The computer storage media includes, but is not limited to, RAM, ROM, EEPROM, flash memory, or other disk storage; CD-ROM, digital versatile disk (DVD), or other optical disk storage; magnetic cassettes, magnetic tape, magnetic disk storage or other magnetic storage; any other medium which may be used to store the desired information and which may be accessed by a computer. In addition, the communication media typically embodies computer readable instructions, data structures, program modules or other data in a modulated data signal such as a carrier wave or other transport mechanism and includes any information delivery media, as is well known to one of ordinary skill in the art.

The present disclosure has disclosed example embodiments, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one of ordinary skill in the art. It will, therefore, be understood by one of ordinary skill in the art that various changes in form and details may be made therein without departing from the scope of the present disclosure as set forth in the appended claims.

What is claimed is:

1. A service code interpretation weaving method, comprising:

acquiring an entity class object generated by a background service module; and calling a customized serializer to perform an interpretation mapping on a code field value of a preset service code field in the entity class object, to obtain a code interpretation value corresponding to the code field value, and adding the code interpretation value to the entity class object, wherein the performing the interpretation mapping on the code field value of the preset service code field comprises:

acquiring the code interpretation value corresponding to the code field value according to pre-stored mapping data, wherein the mapping data comprise different code field values and code interpretation values corresponding to the code field values, wherein before the performing the interpretation mapping on the code field value of the preset service code field, the method further comprises:

acquiring the mapping data from a storage server, and storing the mapping data in a cache, wherein the acquiring the code interpretation value corresponding to the code field value according to the pre-stored mapping data comprises:

acquiring the code interpretation value corresponding to the code field value according to the mapping data stored in the cache, wherein the acquiring the mapping data from the storage server comprises:

acquiring a total number of pieces of correspondence data in the mapping data stored in the storage server, wherein one piece of correspondence data comprises one code field value and a code interpretation value corresponding to the code field value;

generating a plurality of data acquisition tasks according to the total number of pieces of the correspondence data;

allocating the plurality of data acquisition tasks to a plurality of slave processing units, respectively, so that each slave processing unit acquires correspondence data corresponding to a received data acquisition task from the storage server according to the received data acquisition task; and receiving the correspondence data returned by each slave processing unit, and summarizing the correspondence data to obtain the mapping data.

2. The method of claim 1, wherein the acquiring the code interpretation value corresponding to the code field value according to the pre-stored mapping data comprises:

acquiring the code interpretation value corresponding to the code field value according to the mapping data stored in the cache.

3. The method of claim 2, further comprising:

synchronously modifying the mapping data in the cache and the storage server in response to a mapping modification request.

4. The method of claim 1, wherein the generating the plurality of data acquisition tasks according to the total number of pieces of the correspondence data comprises:

calculating a number n of data acquisition tasks to be generated according to a total number q of pieces of the correspondence data and a number p of pieces of correspondence data corresponding to a preset single data acquisition task; wherein $$n = \left\lceil \frac{q}{p} \right\rceil, \text{ and } \left\lceil \frac{q}{p} \right\rceil$$

indicates an upward-rounded value of a quotient of q divided by p; and determining the correspondence data corresponding to each data acquisition task in the mapping data, and generating each data acquisition task, wherein the correspondence data corresponding to different data acquisition tasks are different.

5. The method of claim 1, wherein the allocating the plurality of data acquisition tasks to the plurality of slave processing units, respectively, comprises:

determining a number of usable slave processing units and a node address of each slave processing unit;

determining an allocation number corresponding to each data acquisition task, wherein the allocation number corresponding to an $i^{th}$ data acquisition task is S_i-Hash (M_i) % j, M_i represents a task number corresponding to the $i^{th}$ data acquisition task, j represents the number of usable slave processing units, Hash (M_i) represents a Hash operation on the task number M_i corresponding to the $i^{th}$ data acquisition task, % represents a remainder operation, and 1≤i≤n, where n is the calculated number of data acquisition tasks;

determining the node address corresponding to each data acquisition task according to number-address correspondence data acquired in advance, wherein the number-address correspondence data comprise different allocation numbers and node addresses corresponding to the different allocation numbers; and sending each data acquisition task to the corresponding slave processing unit according to the node address corresponding to each data acquisition task.

6. The method of claim 1, wherein after adding the code interpretation value to the entity class object, the method further comprises:

performing a serialization processing on the entity class object comprising the code interpretation value, to obtain serialized data; and feeding back the serialized data to the service request end.

7. The method of claim 1, wherein the preset service code field in the entity class object is configured with a customized serialization annotation specifying the customized serializer;

the customized serialization annotation is @JsonSerialize annotation; and the customized serializer is a customized jackson serializer.

8. A non-transitory computer-readable storage medium having stored thereon computer-executable instructions which, when executed by a processor, implement the method of claim 1.

9. A service system, comprising: a background service module and a serialization module, wherein the background service module is configured with a service data acquisition interface, and the serialization module comprises an interception calling unit and a customized serializer;

the service data acquisition interface is configured to generate a corresponding entity class object in response to a service data calling request;

the interception calling unit is configured to acquire the entity class object generated by the background service module; and the customized serializer is configured to perform an interpretation mapping on a code field value of a preset service code field in the entity class object, to obtain a code interpretation value corresponding to the code field value, and add the code interpretation value to the entity class object, wherein the customized serializer comprises:

an acquisition unit configured to acquire the code field value of the preset service code field;

a mapping unit configured to perform the interpretation mapping on the code field value to obtain the code interpretation value corresponding to the code field value; and an adding unit configured to add the code interpretation value to the entity class object, wherein the mapping unit is configured to acquire the code interpretation value corresponding to the code field value according to pre-stored mapping data, wherein the mapping data comprise different code field values and code interpretation values corresponding to the code field values, wherein the service system further comprises: a maintenance module, wherein the maintenance module comprises: a data synchronization unit; and the data synchronization unit is configured to acquire the mapping data from a storage server and store the mapping data in the cache, wherein the data synchronization unit comprises: a main processing unit and a plurality of slave processing units;

the main processing unit comprises:

an acquisition sub-unit configured to acquire a total number of pieces of correspondence data in the mapping data stored in the storage server, wherein one piece of correspondence data comprises one code field value and a code interpretation value corresponding to the code field value;

a generation sub-unit configured to generate a plurality of data acquisition tasks according to the total number of pieces of the correspondence data;

an allocation sub-unit configured to allocate the plurality of data acquisition tasks to the plurality of slave processing units, respectively; and a summarizing sub-unit configured to receive the correspondence data returned by each slave processing unit, and summarize the correspondence data to obtain the mapping data; and each slave processing unit is configured to acquire the correspondence data corresponding to a received data acquisition task from the storage server according to the received data acquisition task, and feed back the acquired correspondence data to the main processing unit.

10. The service system of claim 9, wherein the mapping unit is configured to acquire the code interpretation value corresponding to the code field value according to the mapping data stored in the cache.

11. The service system of claim 10, wherein the maintenance module further comprises: a modification unit; and the modification unit is configured to synchronously modify the mapping data in the cache and the storage server in response to a mapping modification request.

12. The service system of claim 9, wherein the generation sub-unit is configured to: calculate a number n of data acquisition tasks to be generated according to a total number q of pieces of the correspondence data and a number p of pieces of correspondence data corresponding to a preset single data acquisition task, where $$n = \left\lceil \frac{q}{p} \right\rceil, \text{ and } \left\lceil \frac{q}{p} \right\rceil$$

indicates an upward-rounded value of a quotient of q divided by p; determine the correspondence data corresponding to each data acquisition task in the mapping data, and generate each data acquisition task, wherein the correspondence data corresponding to different data acquisition tasks are different.

13. The service system of claim 9, wherein the allocation sub-unit is configured to:

determine a number of usable slave processing units and a node address of each slave processing unit;

determine an allocation number corresponding to each data acquisition task, wherein the allocation number corresponding to an $i^{th}$ data acquisition task is S_i=Hash(M_i) % j, M_i represents a task number corresponding to the $i^{th}$ data acquisition task, j represents the number of usable slave processing units, Hash (M_i) represents a Hash operation on the task number M_i corresponding to the $i^{th}$ data acquisition task, % represents a remainder operation, and $1 \le i \le n$, where n is the calculated number of data acquisition tasks;

determine the node address corresponding to each data acquisition task according to number-address correspondence data acquired in advance, wherein the number-address correspondence data comprise different allocation numbers and node addresses corresponding to the different allocation numbers; and send each data acquisition task to the corresponding slave processing unit according to the node address corresponding to each data acquisition task.

* * * * *